Oct. 14, 1924.
C. MAKAY
REAMER
Filed Feb. 17, 1923
1,511,898
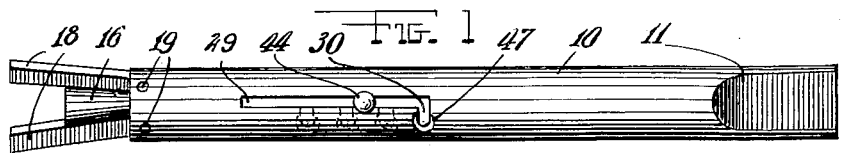
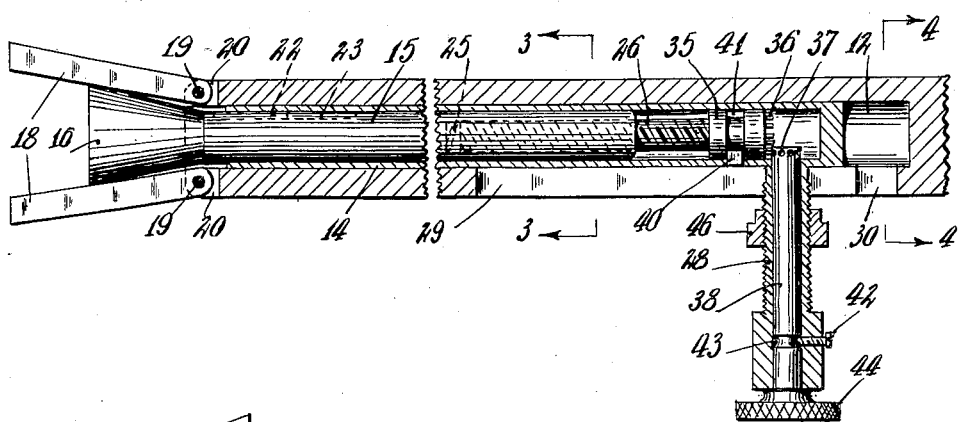
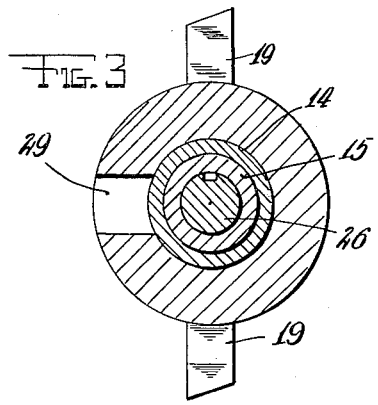
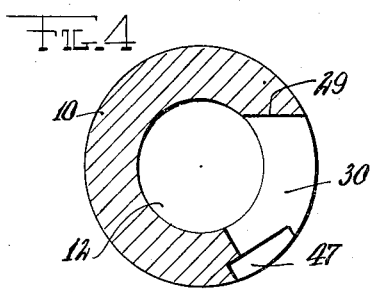
Inventor
Carl Makay Patented Oct. 14, 1924.

1,511,898

UNITED STATES PATENT OFFICE.

CARL MAKAY, OF PORTLAND, OREGON.

REAMER.

Application filed February 17, 1923. Serial No. 619,704.

*To all whom it may concern:*

Be it known that I, CARL MAKAY, citizen of Russia, residing at Portland, in the county of Multnomah and State of Oregon, have invented certain new and useful Improvements in Reamers, of which the following is a specification.

This invention relates generally to reamers, having more particular reference to a reamer with radially adjustable blades permitting use of the reamer in holes of different diameter and also in undercutting work.

The invention has for an object to provide a reamer of the above type of simple construction and adapted for ready and rapid adjustment of the blades.

For further comprehension of the invention, and of the objects and advantages thereof, reference will be had to the following description and accompanying drawings, and to the appended claims in which the various novel features of the invention are more particularly set forth.

Fig. 1 of the drawings is a side view of my improved reamer.

Fig. 2 is an enlarged fragmentary longitudinal sectional view thereof.

Fig. 3 is a transverse sectional view taken on the line 3—3 of Fig. 2.

Fig. 4 is a like view taken on the line 4—4 of Fig. 2.

As here shown my improved reamer comprises an elongated body or shank 10 which may be flattened at one end as indicated at 11 in Fig. 1 for insertion in a suitable turning implement. Extending inwardly from the opposite end of the reamer is an axial passage 12 which may extend approximately one-half the length of the shank. In this passage 12 is freely positioned a sleeve 14 which may have a solid inner end as shown, the sleeve being somewhat shorter than the passage.

Positioned freely in the sleeve 12 is a rod 15 which is of less length than the sleeve and projects from the forward end of the latter. The front end of the rod 15 is formed with an outwardly flaring conical head 16 which is adapted to engage the cutting blades of the reamer for adjustment purposes. These blades are indicated at 18 and are here shown as being two in number and spaced opposite one another. These blades are pivoted as at 19 in recesses 20 in the front end of the shank 10 and project beyond the latter, and beyond the conical head 16, also, and are provided with ordinary cutting edges.

The rod 15, while free to move longitudinally in the sleeve 14, is held against turning movement with respect to the latter by means of a pin or key 22 in the sleeve engaging in a longitudinal groove 23 in the rod. Formed in the rear end of the rod 15 is a threaded socket 25 in which engages a screw 26 swiveled in the sleeve 14, that is to say positioned therein to permit of turning movement with respect thereto but held against relative longitudinal movement.

For adjustment of the blades 18 so as to vary the radial spacing of their cutting faces the sleeve 14, carrying with it bodily the rod 15, is moved longitudinally in the passage 12, and to permit of such adjustment manually the sleeve is formed at its rear end with a radially projecting arm 28 which extends through a longitudinal slot 29 in the wall of the passage 12. To lock the sleeve in this position the arm 28 may be swung into an offset 30 from the slot 29. When the reamer is intended for use on one fixed size of work only one of these offsets 30 need be provided, but where the reamer is intended for general work I preferably provide other offsets spaced along the slot as indicated in dotted lines in Fig. 1 to receive the arm 28.

To compensate for wear due to sharpening of the blades, and also to permit of exact adjustment of the latter, I have provided a means whereby the screw 26 may be rotated to vary the relative positions of the sleeve 14 and rod 15. The screw 26 is here shown as formed with a head 35 in which are pins 36 adapted to engage in holes 37 spaced around the inner end of a pintle 38 extending longitudinally through the arm 28, which latter is hollow, whereby upon rotation of the pintle the screw 26 will be rotated; the pins 36 and holes 37 forming in effect a crown gear device, as will be apparent. The screw 26 may be held against longitudinal movement in the sleeve 14 by means of a pin 40 fixed therein and engaging in a circumferential groove 41 in the head 35. Similarly the pintle 38 may be held against longitudinal movement in the arm 28 by means of a screw 42 threaded into the latter and engaging in a circumferential groove 43 in the pintle. The latter may have a head 44 thereon for turning purposes.

The arm 28 may be held against displacement from the offset 30 by means of a collar 46 threaded on the arm and which may be screwed along the latter to project its forward end into an enlargement 47 of the said offset.

It is believed that the manner of operation and use of my improved reamer will be apparent from the above description and that no further description thereof is needed. It is to be understood that while I have described and shown a preferred embodiment of my invention I do not limit myself in detail thereto and that various changes and modifications might be made therein without departing from the spirit and scope of the invention as defined in the appended claims.

Having thus described my invention what I claim as new and desire to protect by Letters Patent of the United States is as follows:

1. A reamer comprising a shank, a pair of cutting blades pivoted thereto, and means for adjustably positioning said blades in a radial direction, said means comprising a sleeve longitudinally movable in said shank, and a rod longitudinally movable in said sleeve, and an arm on said sleeve adapted to move said sleeve and rod bodily in a longitudinal direction, said arm projecting through a longitudinal slot in the shank, the said slot having an offset into which the said arm may be swung to lock the sleeve against longitudinal movement.

2. A reamer comprising a shank, a pair of cutting blades pivoted thereto, and means for adjustably positioning said blades in a radial direction, said means comprising a sleeve longitudinally movable in said shank, and a rod longitudinally movable in said sleeve, and an arm on said sleeve adapted to move said sleeve and rod bodily in a longitudinal direction, said arm projecting through a longitudinal slot in the shank, the said slot having an offset into which the said arm may be swung to lock the sleeve against longitudinal movement, and means for locking said arm in said offset.

3. A reamer comprising a shank formed with an axial passage leading in from the front end thereof, a sleeve slidable in said passage, a rod slidable but non-rotatable in said sleeve, a conical head on the front end of said rod, a pair of cutting blades pivoted to the shank and having said rod abutting thereagainst, a screw swiveled in said sleeve and engaging in the rear end of said rod, a hollow handle on said arm projecting through a longitudinal slot in said shank, a pintle in said handle having a crown gear connection with said screw, said slot having an offset adapted to receive the said arm, for the purpose specified.

In testimony whereof I have affixed my signature.

CARL MAKAY.